(12) United States Patent
Yamada

(10) Patent No.: US 7,391,578 B2
(45) Date of Patent: Jun. 24, 2008

(54) PROJECTION ZOOM LENS SYSTEM AND PROJECTOR APPARATUS USING THE SAME

(75) Inventor: Yasuharu Yamada, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/319,623

(22) Filed: Dec. 29, 2005

(65) Prior Publication Data

US 2006/0146421 A1     Jul. 6, 2006

(30) Foreign Application Priority Data

Jan. 4, 2005     (JP) ............................ 2005-000056

(51) Int. Cl.
*G02B 15/14* (2006.01)

(52) U.S. Cl. ...................... 359/689; 359/679

(58) Field of Classification Search ............... 359/689, 359/679
See application file for complete search history.

(56) References Cited

U.S. PATENT DOCUMENTS 6,870,689 B2 *  3/2005  Yoshida ...................... 359/683

2004/0109239 A1   6/2004  Yoshida
2004/0257670 A1  12/2004  Kawakami
2006/0109564 A1 *  5/2006  Sawamoto ................... 359/691

FOREIGN PATENT DOCUMENTS

| JP | 2003-315675 | 1/2003 |
| JP | 2004-020799 | 1/2004 |
| JP | 2004-317644 | 11/2004 |
| JP | 2004-317645 | 11/2004 |

* cited by examiner

*Primary Examiner*—Jordan M Schwartz
(74) *Attorney, Agent, or Firm*—Kenyon & Kenyon LLP

(57) ABSTRACT

A projection zoom lens includes, in order from an enlargement side, a first lens unit G1 of negative refracting power, a second lens unit G2 of positive refracting power and a third lens unit G3 of positive refracting power. Focusing is implemented by movement of the first lens unit G1 alone. The first lens unit satisfies condition (1) with respect to its movement.

$$0.003 < \Delta d/|f_1| < 0.030 \qquad (1)$$

Here $f_1$ is the focal length of the first lens unit, and $\Delta d$ is the maximum displacement of the first lens unit as measured from a wide-angle end position thereof upon zooming from the wide-angle end to the telephoto end with a projected image focusing at a constant distance.

9 Claims, 4 Drawing Sheets

PROJECTION ZOOM LENS SYSTEM AND PROJECTOR APPARATUS USING THE SAME

This application claims benefit of Japanese Application No. 2005-56 filed in Japan on Jan. 4, 2005, the contents of which are incorporated by this reference.

BACKGROUND OF THE INVENTION

The present invention relates generally to a projection zoom lens and a projector apparatus using the same, and more specifically to a projection zoom lens for enlargement and projection of an image from a light bulb using a DMD (digital micro-mirror device) operable to select the direction of reflection of light, and a projector apparatus using the same.

So far, numerous projectors for enlarging and projecting images displayed on LCDs (liquid crystal devices) have been proposed. As well known in the art, DMDs comprising a micro-mirror array and operable to change the direction of reflection of light to form a display image toward a specific direction, too, are usable in place of LCDs.

A DMD, because it responds more quickly to control signals than does an LCD and is a reflection type device, is lower in the transmission loss of light quantity than a transmission type LCD. Therefore, when it comes to screen illuminance equivalent to that obtained through an LCD projector, a DMD projector is more favorable than the LCD projector, because the power of a light source unit can be lower, and a cooler used with it can be smaller in size and quieter than the LCD projector. In other words, if DMDs are used in lieu of LCDs, it would then be possible to provide a projector apparatus of far higher luminance and even smaller size.

In DMDs, however, the angle of rotation of the micromirror is set at ±12°. By a choice of this angle of rotation of the mirror, there is a switchover from reflected light (effective light) incident on a projection lens and used for projection to reflected light (ineffective light) not incident on the projection lens, and vice versa. Restrictions on the range of the angle of rotation place some limitations on where to locate an illumination optical system operable to enter illumination light into a light bulb in a DMD or the like and a projection lens operable to produce effective light; the illumination optical system and the projection lens must be proximate to the DMD in the same direction.

To stay away interference between the illumination optical system and the projection lens, there are some needs of reducing the diameter of a lens located in, and nearest to the reduction side of, the projection lens arrangement as much as possible, thereby ensuring that there is a large enough space (back focus) between the projection lens and the DMD, and implementing optical design in consideration of the fact that an optical member located near the DEM is used for both the illumination optical system and the projection optical system.

To address demands for size reductions of the projector apparatus, reductions of projection distance, an increasing degree of flexibility in location, cost reductions, and so on, various types of projection lenses contributing to size reductions, wide-angle arrangements, zooming arrangements and reductions in the number of lenses are now under study.

There are proposed several techniques of locating a convex lens (field lens) just before a DMD such that it is used not only for an illumination optical system but also as a part of a projection lens, thereby allowing the field lens to share a part of the aberration correction function of the projection lens. With such techniques, the whole optical system in the DMD projection apparatus can be made compact.

SUMMARY OF THE INVENTION

One object of the invention is to provide a projection zoom lens of simplified construction suitable for the enlargement and projection of an image from a light bulb in a DMD or the like adapted to change the direction of reflection of light.

Another object of the invention is to provide a projection zoom lens having a short total length.

Yet another object of the invention is to provide a projection zoom lens capable of a wider-angle projection without detrimental to optical performance.

A further object of the invention is to provide a compact projector apparatus.

The zoom projection zoom lens system according to one aspect of the invention comprises, in order from an enlargement side to a reduction size, a first lens unit of negative refracting power, a second lens unit of positive refracting power, and a third lens unit of positive refracting power, wherein:

upon zooming from a wide-angle end to a telephoto end with a projected image focusing on a constant position, the first lens unit and the second lens unit move while the third lens unit remains fixed, and wherein:

the third lens unit is located in front of a light bulb, and transmits an incident light ray from an illumination optical system adapted to illuminate the light bulb and a light ray reflected from the light bulb.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Some embodiments of the projection zoom lens according to the invention and the projector apparatus to which the same is applied will now be explained with reference to the accompanying drawings.

First of all, the projection zoom lens will be explained, and the projector apparatus using the same will then be explained.

Figure 1:
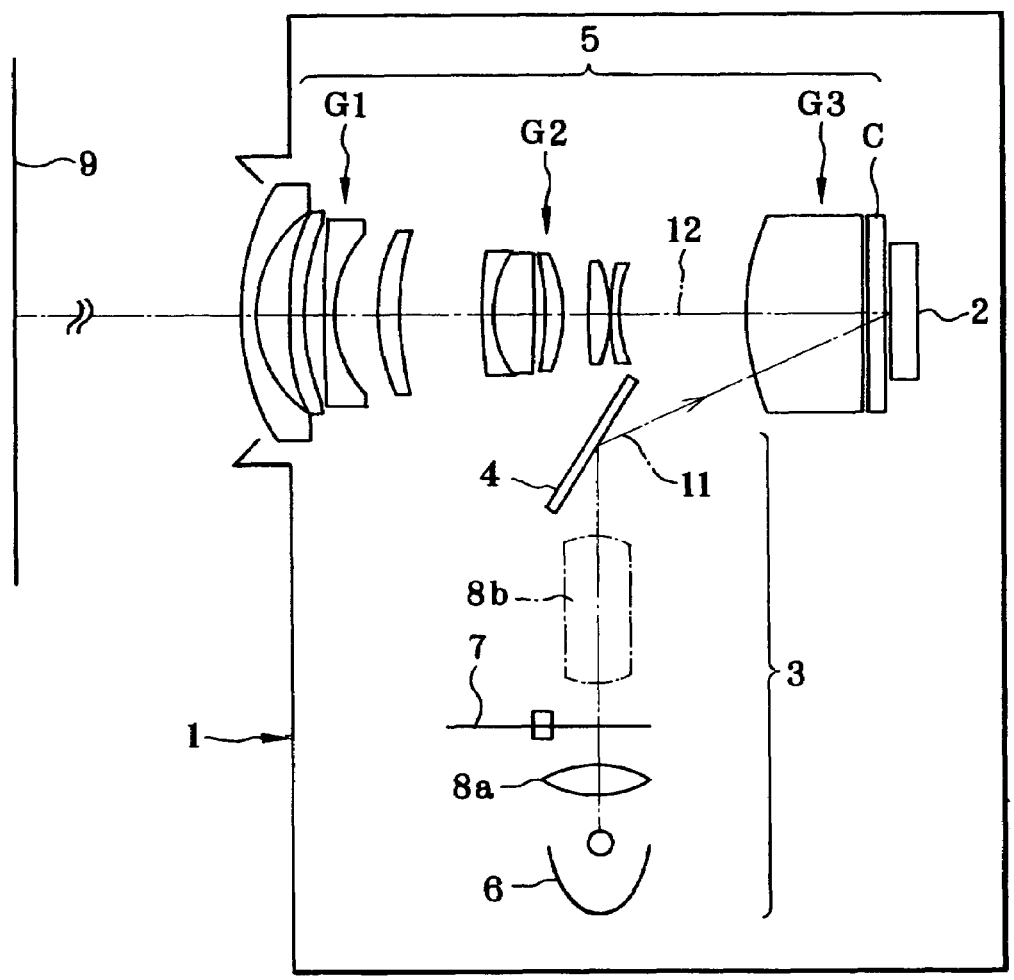
FIG. 1 is illustrative in construction of how optical elements are located in a DMD projector apparatus using the projection zoom lens according to Example 1 of the invention.

As depicted in FIG. 1, the projection zoom lens according to this embodiment comprises, in order from the side of an enlarging screen 9, a first lens unit G1 of negative refracting power, a second lens unit G2 of positive refracting power and a third lens unit G3 of positive refracting power. Upon zooming from the wide-angle end to the telephoto end with a projected image focusing at a constant distance, the first lens unit G1, and the second lens unit G2 moves on the optical axis of the zoom lens while the third lens unit G3 remains fixed.

The third lens unit G3 is located in front of a light bulb 2 operable to form the optical image to be projected, transmitting an incident light ray 11 from an illumination light optical system 3 adapted to illuminate the light bulb 2 and a light ray 12 reflected from the light bulb 2. Upon focusing, only the first lens unit G1 moves. And then, the first lens unit G1 satisfies the following condition (1):

$$0.003 < \Delta d/|f_1| < 0.030 \tag{1}$$

where $f_1$ is the focal length of the first lens unit, and $\Delta d$ is the maximum displacement of the first lens unit from a wide-angle end position thereof upon zooming from the wide-angle end to the telephoto end with an projected image focusing at a constant distance; in another parlance, $\Delta d$ is a difference in position between the state where the first lens unit is positioned nearest to the enlargement side and the state where the first lens unit is positioned nearest to the reduction side.

As negative refracting power and positive refracting power are allocated to the first lens unit G1 and the second lens unit G2 in the projection zoom lens shown generally at 5, it allows for a retro focus type lens arrangement wherein a long enough back focus (the space between the second lens unit G2 and the third lens unit G3) can be ensured even at a wide angle of view, and the projection lens system 5 is much less likely to interfere with the illumination optical system 3.

By allowing the third lens unit G3 (the field lens) to have positive refracting power, illumination light 11 obliquely incident from the illumination optical system 3 on the light bulb 2 in a DMD or the like is made parallel, and light 12 reflected from the light bulb 2 is refracted to the projection optical system 5 in a converging direction. Therefore, the second lens unit G2 can be slimmed down.

Upon zooming from the wide-angle end to the telephoto end, the first lens unit G1 functions as a compensator and the second lens unit G2 does as a variator, so that fluctuations of various aberrations can be held back, and the stroke of the first lens unit G2 can be shortened. Therefore, there can be no or little change in the total length of the projection zoom lens 5.

As the third lens unit G3 is fixed as the field lens, there is no or little fluctuation of the entrance pupil position for the projection light 12 incident from the light bulb 2 via the field lens (the third lens unit G3). Therefore, there is no or little variation of illuminance on a screen 9.

Focusing is implemented by the movement of the first lens unit G1 alone, and so there is no interference between the projection optical system 5 and the illumination light system 3 due to focusing.

As the first lens unit G1 fails to satisfy the lower limit of 0.003 to condition (1), there is no high enough zoom ratio, because the amount of movement of the first lens unit G1 is small. Conversely, as the upper limit of 0.030 to condition (1) is exceeded, the amount of movement of the first lens unit G1 becomes large, making the mechanism for moving the first lens unit G1 complicated.

If the first lens unit G1 satisfies condition (1), the angle of projection (the angle of view) can then be substantially controlled by the movement of the second lens unit G1 upon zooming, thereby implementing focusing by the first lens unit G1 at a position with the angle of view set. In other words, there is no need of keeping the first lens unit G1 in mechanical association with the second lens unit G2 for zooming operation, and so the respective lens units can function independently on their own merits. Therefore, the zoom mechanism system can be simplified. Such a scheme includes a technique of implementing an auto-focus function even at the time of movement of the second lens unit G2, thereby tracking the position of the first lens unit G1 for focusing. One of the advantages of this scheme is that optical performance could be kept intact even upon exposure to environmental changes such as temperature changes.

Regarding condition (1), that lower limit should preferably be set at 0.005, especially 0.007 in view of getting hold of zoom ratios.

Preferably, that upper limit should be set at 0.020, especially 0.015 in view of simplification of the mechanism for moving the first lens unit G1.

In view of circumstances of using the projector apparatus 1, the position of the projected image should be defined by the aforesaid constant distance or the projection distance of 1.6 m.

Upon zooming from the wide-angle end to the telephoto end, the first lens unit G1 first moves toward the reduction side, and then returns back to the enlargement side. And then, the first lens unit G1 satisfies the following condition (1-1):

$$1.7 < dA/\Delta d/ \leq 2.0 \tag{1-1}$$

where dA is the total amount of movement of the first lens unit G1 upon zooming from the wide-angle end to the telephoto end with the projected image focusing on a constant position, and $\Delta d$ is the maximum displacement of the first lens unit G1 from a wide-angle end position thereof upon zooming from the wide-angle end to the telephoto end with the projected image focusing at a constant distance; in another parlance, $\Delta d$ is a difference in position between the state where the first lens unit is positioned nearest to the enlargement side and the state where the first lens unit is positioned nearest to the reduction side.

Why the first lens unit G1 moves fore and back in association with zooming is now explained. If the first lens unit G1 is designed to move fore and back, then the total length of the projection zoom lens 5 can be shortened while a suitable zoom ratio is ensured. In other words, condition (1-1) is to define the ratio between the whole stroke and the maximum displacement of the first lens unit G1 for allowing the first lens unit G1 to lie in substantially the same position at the wide-angle end and the telephoto end.

As the ratio between the whole amount of movement of the first lens unit G1 and the maximum displacement thereof from the wide-angle end is less than the lower limit of 1.7 to condition (1-1), it causes an increase in the total length of the projection zoom lens 5 at the wide-angle end or the telephoto end. On the other hand, the upper limit of 2.0 to condition (1-1) is indicative of a state where the first lens unit lies in the same position at the wide-angle end and the telephoto end; there is principally no state greater than that upper limit of 2.0.

It is here understood that although other lens unit(s) for correction of aberrations may be added to the first lens unit G1, the second lens unit G2 and the third lens unit G3, the three units type arrangement is still preferable because of simplification of the moving mechanism.

Referring further to the three units type arrangement, it is acceptable to implement floating with a variable minute space in each lens unit for the purpose of improving on the ability to correct aberrations. For a lot more simplification of the moving mechanism for the lens unit, it is preferable that the spaces variable at the time of zooming are limited to those between the first and the second lens unit and between the second and the third lens unit.

Next, each lens unit is explained at great length. As depicted in FIG. 2, the first lens unit G1 is made up of, in order from the enlargement side, a negative meniscus lens L1 convex on the enlargement side, an aspheric lens L2, a negative lens L3 wherein the absolute value of curvature is larger on the reduction side than on the enlargement side, and a positive lens L4 wherein the absolute value of curvature is larger on the enlargement side than on the reduction side.

In the first lens unit G1, the negative meniscus lens L1 convex on the enlargement side cooperates with the lens L2 having aspheric surfaces to correct aberrations with respect to an off-axis light beam at a wide angle of view. And then, the negative lens L3 having a tight curvature (strong power) on the reduction (light bulb 2) side and the positive lens L4 having a tight curvature on the enlargement side are used to control the occurrence of chromatic aberrations and balance aberrations of an axial light beam against those of an off-axis light beam.

With the negative lens L3 and the positive lens L4 located in the first lens unit G1 and on the reduction side, each composed of a meniscus lens convex on its enlargement side, the occurrence of higher-order aberrations is held back with easy control of the amount of aberrations.

Focusing is implemented by the movement of the first lens unit G1 alone; there is no interference between the projection zoom lens 5 and the illumination optical system 3 by reason of focusing.

In this embodiment, the first lens unit G1 and the second lens unit G2 include aspheric surfaces, one per each, so that astigmatism and field curvature likely to grow large in a wide-angle arrangement as well as distortion can be corrected with fewer lenses.

In the first lens unit G1, the second lens L2 as counted from the enlargement side is a plastic aspheric lens. With the lens L2 that is larger in effective diameter than those in other lens units, more cost reductions are achievable as compared with a glass molded aspheric lens of the same shape.

Another advantage of using the plastic lens for a lens in the first lens unit G1 is that the first lens unit is spaced away from a heat source such as a light source 6, so that it is less susceptible to influences of temperature rises due to the light source 6. The plastic lens, because of being generally vulnerable to damage, is also preferably located in such a way as to be not exposed to direct view.

That plastic aspheric lens L2 is fabricated by means of molding, and so can be fabricated at the lowest cost among various fabrication processes.

In the projection zoom lens 5 according to the present embodiment, the plastic aspheric lens L2 that is the second lens L2 in the first lens unit G1 satisfies the following condition (2):

$$0.5 < d_{3,E}/d_{3,C} < 2.0 \quad (2)$$

where $d_{3,C}$ is the center thickness of the plastic aspheric lens L2, and $d_{3,E}$ is the thickness of the plastic aspheric lens L2 at the outermost of the effective portion.

Condition (2) is to define the ratio of the thickness $d_{3,E}$ of the outermost of the effective portion of the lens L2 in the first lens unit G1 to the center thickness $d_{3,C}$ of that lens L2.

If the shape of the lens L2 in the first lens unit G1 fails to satisfy the upper limit of 2.0, or the lower limit of 0.5, to condition (2), there is then a change in the shape or refractive index with changes in surrounding temperature and humidity, which may otherwise cause a difference in the properties between the center and the periphery of the lens, resulting in difficulty in maintaining the desired optical performance.

The lower limit to condition (2) should more preferably be set at 0.69, especially 0.83, and the upper limit should more preferably be set at 1.5, especially 1.2.

Next, the second lens unit G2, and the third lens unit G3 will be explained in further details. As depicted in FIG. 2, the lens located in, and nearest to the reduction size of, the second lens unit G2 is a negative lens L9 concave on its reduction side, and the lens located in, and nearest to the enlargement side of, the third lens unit G3 is a positive lens L10 convex on its enlargement side. And then, the second and the third lens unit satisfy the following condition (3):

$$0.4 < r_{2,r}/r_{3,f} < 0.6 \quad (3)$$

where $r_{2,r}$ is the paraxial radius of curvature of the lens located in, and nearest to the reduction side of, the second lens unit G2, and $r_{3,f}$ is the paraxial radius of curvature of the lens located in, and nearest to the enlargement side of, the third lens unit G3.

The lens located in, and nearest to the reduction side of, the second lens unit G2 is configured as the negative lens L9 concave on its reduction side, and the lens located in, and nearest to the enlargement side of, the third lens unit G3 is configured as the positive lens L10 convex on its enlargement side. Thus, the illumination light 11 incident from the illumination optical system 3 obliquely on the light bulb 2 in a DMD or the like is made parallel, and the reflected light 12 from the light bulb 2 is refracted in a converging direction with respect to the projection optical system 5. Therefore, the second lens unit G2 can be slimmed down.

Condition (3) is to define the ratio of the radius of curvature, $r_{2,r}$, of the surface located in, and nearest to the reduction side of, the second lens unit G2 to the radius of curvature, $r_{3,f}$, of the lens located in, and nearest to the enlargement side of, the third lens unit G3.

When the upper limit of 0.6 to condition (3) is exceeded, aberrations occurring at a light ray converging surface (the third lens unit G3) are not canceled out at the subsequent light ray diverging surface (the second lens unit G2), rendering correction of them difficult, because the radius of curvature, $r_{3,f}$ of the lens located in, and nearest to the enlargement side of, the third lens unit G3 is relatively smaller than that, $r_{2,r}$, of the surface that is adjacent thereto, and is located in, and nearest to the reduction side of, the second lens unit G2.

When the lower limit of 0.4 to condition (3) is not reached, on the other hand, aberrations occurring at the light beam diverging surface (the second lens unit G2) grows larger than at the adjoining light ray converging surface (the third lens unit G3); those aberrations are not canceled out, rendering correction of them difficult, because the radius of curvature, $r_{3,f}$ of the surface located in, and nearest to the enlargement side of, the third lens unit G3 is relatively larger than that, $r_{2,r}$, of the surface that is adjacent thereto, and is located in, and nearest to the reduction side of, the second lens unit G2.

Regarding condition (3), it is preferable for correction of aberrations that the lower limit is set at 0.43, especially 0.46.

Regarding condition (3), it is preferable for correction of aberrations that the upper limit is set at 0.55, especially 0.50.

In the projection zoom lens 5, the second lens unit G2 comprises, in order from the enlargement side, a cemented doublet consisting of a negative lens L5 and a positive lens L6 and a positive lens L7 convex on the reduction side, and comprises, in order from the reduction side, a negative meniscus lens L9 concave on the reduction side and a positive lens L8 wherein the absolute value of curvature is larger on the reduction side than on the enlargement side.

With the cemented doublet of negative-positive power profile located in, and nearest to the enlargement side of, the second lens unit G2, chromatic aberration of magnification in particular can be well controlled. As the lens located nearest to the reduction side is configured as the negative meniscus lens L9 concave on the reduction side and the positive lens L8 having a tight curvature on the reduction side is located on the enlargement side adjacent to the lens L9, aberrations can be well controlled for every light beam from axial one to off-axial one.

In the second lens unit G2, as the positive lens L7 is located with a proper air separation between the cemented doublet and the positive lens L8 having a tight curvature on the reduction side, compactness and high performance are achievable in a well-balanced state.

In the present embodiment, the projection zoom lens satisfies the following conditions (4) and (5) with respect to the first lens unit G1 and the second lens unit G2:

$$1.2 < |f_1|/f_W < 1.6 \quad (4)$$

$$1.4 < f_2/f_W < 1.8 \quad (5)$$

where $f_W$ is the focal length of the whole projection zoom lens system at a projection distance of 1.6 m at the wide-angle end,
  $f_1$ is the focal length of the first lens unit G1, and
  $f_2$ is the focal length of the second lens unit G2.

Condition (4) is to define the ratio of the absolute value of the focal length $f_1$ of the first lens unit G1 to the focal length $f_W$ of the whole system of the projection zoom lens 5 at the wide-angle end (the projection distance of 1.6 m).

As the upper limit of 1.6 to condition (4) is exceeded, it causes the focal length of the first lens unit G1 to become long, failing to obtain a long back focus. Conversely, as the lower limit of 1.2 to condition (4) is not reached, it causes the focal length of the first lens unit G1 to become short, rendering correction of various aberrations difficult.

Exceeding the lower limit of 1.8 to condition (5) may work for correction of various aberrations, because the focal length of the second lens unit G2 becomes long. However, the whole length of the projection zoom lens 5 becomes long and the outside diameter of the first lens unit G1 grows large, resulting in an increase in the cost of the projection zoom lens 5. Conversely, as the lower limit of 1.4 to condition (5) is not reached, it causes the focal length of the second lens unit G2 to become short, rendering correction of various aberrations difficult.

Regarding condition (4), the lower limit should preferably be set at 1.3, especially 1.4.

The upper limit to condition (4) should preferably be set at 1.55, especially 1.5.

Regarding condition (5), the lower limit should preferably be set at 1.5, especially 1.55.

The upper limit to condition (5) should preferably be set at 1.7, especially 1.6.

In the present invention, the projection zoom lens 5 satisfies the following condition (6) with respect to the third lens unit G3:

$$0.2 < d_{17W}/f_3 < 0.4 \quad (6)$$

where $d_{17W}$ is the distance at the wide-angle end between the surface located in, and nearest to the reduction side of, the second lens unit G2 and the surface located in, and nearest to the enlargement side of, the third lens unit G3, and $f_3$ is the focal length of the third lens unit G3.

Condition (6) is to define the ratio to the focal length $f_3$ of the third lens unit G3 of the distance, $d_{17W}$, at the wide-angle end between the surface located in, and nearest to the reduction side of, the second lens unit G2 and the surface located in, and nearest to the enlargement side of, the third lens unit G3.

Preferably, the projection optical system 5 is designed such that upon incidence of the light ray 12 from the light bulb 2 thereon, it is incident from the third lens unit G3 that is the field lens on the pupil position of the second lens unit G2. The reason is to reduce losses of light quantity from the illumination optical system 3, thereby ensuring illuminance on the screen 9.

For the present embodiment wherein the second lens unit G2 moves at the time of zooming, it is only required to satisfy condition (6) with no or little illuminance variations.

As the upper limit of 0.4 to condition (6) is exceeded, it causes the pupil position of the second lens unit G2 to go farther off the light beam 12 from the third lens unit G3 at the telephoto end, resulting in illuminance variations. Conversely, as the lower limit of 0.2 to condition (6) is not reached, it causes the pupil position of the second lens unit G2 to come too close to the light beam 12 from the third lens unit G3, again resulting in illuminance variations.

Regarding condition (6), the lower limit should more preferably be set at 2.25, especially 0.30.

The upper limit to condition (6) should more preferably be set at 0.37, especially 0.34.

The projection zoom lens 5 as exemplified above may be applied to a projector apparatus 1 comprising a light bulb 2, an illumination optical system 3 for directing illumination light 11 to the light bulb 2, and a projection zoom lens 5 for enlarging and projecting effective light 12 of the illumination light 11 reflected by the light bulb 2 as a projected image on a screen 9. It is thus possible to reduce the size of, and enhance the performance of, the projector apparatus 1.

One embodiment of the projector apparatus 1 with the inventive projection zoom lens 5 applied to it is now explained.

FIG. 1 is illustrative in schematic of the construction of the projector apparatus 1 wherein a DMD is adopted as the light bulb 2. This projector apparatus 1 comprises a DMD 2 that is an optical modulator, an illumination optical system (illumination system) 3 for directing illumination light 11 to the DMD 2, and a projection zoom lens 5 for the enlargement and projection of effective light (projection light) 12 reflected by the DMD 2 on a screen 9. Note that a plane-parallel plate C located just before the DMD2 is operable as a transparent member for covering the DMD 2.

The projector apparatus 1 depicted in FIG. 1 is a single-plate type projection, and the illumination optical system 3 comprises a white light source 6 such as a halogen lamp and a rotary disk type color-division filter 7. The illumination light 11 of at least the three primaries, say, red, green and blue is directed to the DMD 2 in a time-division fashion, and at timing of irradiation with light of each color, each pixel of the DMD 2 (micro-mirror array) is controlled by means of a control circuit (not shown) to form a color image as desired.

Depending on the internal arrangement of the projector apparatus 1, the illumination optical system 3 is built up of a condenser lens 8a, an objective optical system 8b and a total-reflection mirror 4, etc., all operable to direct the illumination light 11 from the light source 6 to the DMD 2.

The DMD 2 is an optical modulator having a plurality of pixels (digital mirror) for selecting the direction of reflection of the illumination light 11 to form an image. In the projector apparatus 1 having the DMD 2, as the normal line to the reflecting surface of the DMD 2 is in alignment with the optical axis of the projection zoom lens 5, it enables an image circle diameter and, hence, the diameter of the projection zoom lens 5 to become small, and ensures separation of effective light from ineffective light.

Now that the angle of incidence of light from the illumination optical system 3 on the DMD 2 is already determined from current specifications, there is no option but to bring the optical axis of the illumination optical system 3 close to the optical axis of the projection zoom lens 5. Therefore, to clear restrictions of the illumination optical system 3 on layouts, it is required to make long the back focus of the projection zoom lens 5 (the space between the second lens unit G2 and the third lens unit G3 in FIG. 1).

To ensure the separation of the effective projection light 12 from ineffective light by the DMD 2, the diameter of the final lens L9 positioned in the second lens unit G2 in the projection zoom lens 5 and on the side of the DMD 2 must be reduced as much as possible.

The projection zoom lens 5 in the projector apparatus 1 as exemplified above is designed in such a way as to satisfy all such restrictive design requirements.

The projection zoom lens 5 is built up of, in order from the screen 9 side (enlargement side) to the light bulb 2 side (reduction side), a first lens unit G1 having negative refracting power and operable to move during zooming and focusing, a second lens unit G2 having positive refracting power and operable to move during zooming, and a third lens unit G3 having positive refracting power and remaining fixed all the time. During zooming, the first lens unit G1 and the second lens unit G2 function as a compensator and a variator, respectively. Focusing is implemented by the movement of the first lens unit G1.

Figure 2A:
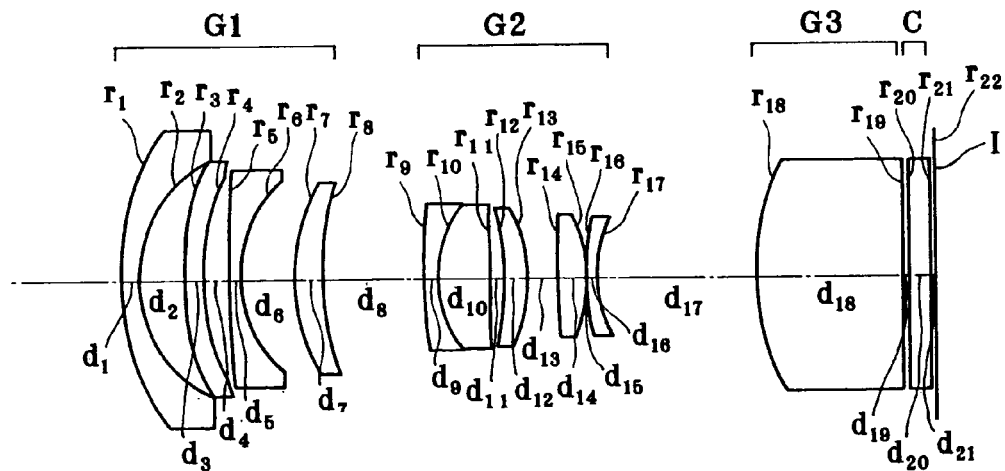
FIGS. 2(a), 2(b) and 2(c) are illustrative in lens arrangement section including an optical axis of the projection zoom lens according to Example 1 at the wide-angle end, in an intermediate setting, and at the telephoto end, respectively.
Figure 2B:
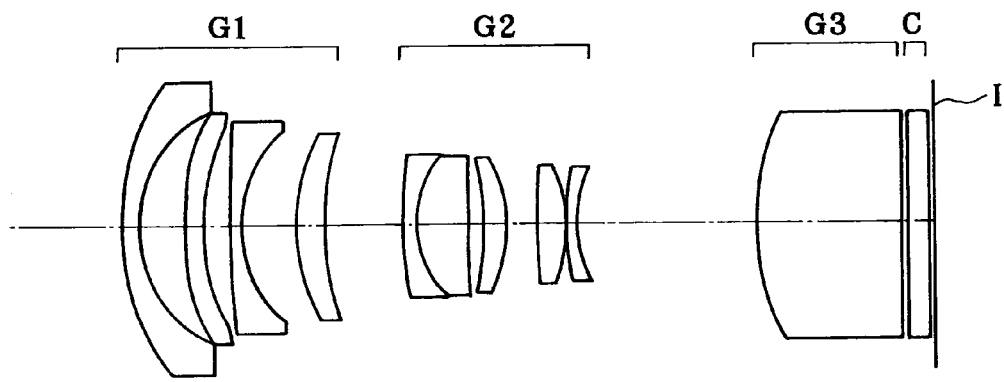
Figure 2C:
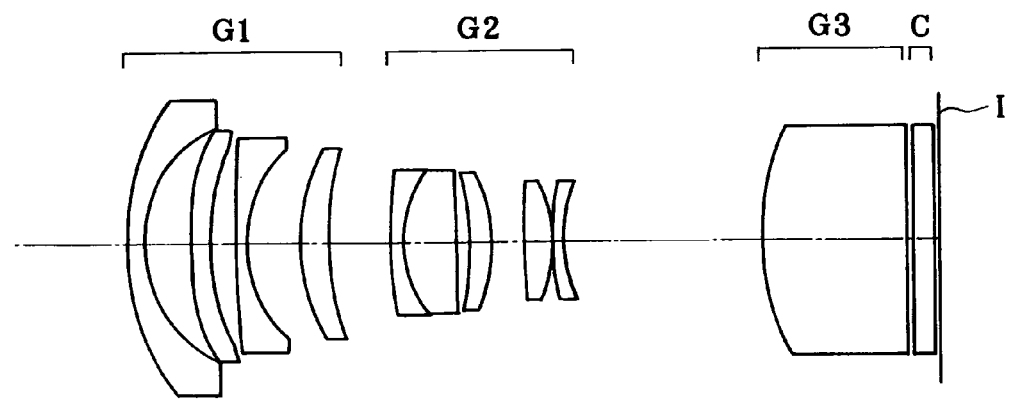

FIGS. 2(a), 2(b) and 2(c) are illustrative in section including the optical axis of the projection zoom lens 5 in the projector apparatus 1 depicted in FIG. 1. Specifically, FIGS. 2(a), 2(b) and 2(c) are illustrative in lens arrangement section of the projection zoom lens 5 at the wide-angle end, in an intermediate setting, and at the telephoto end, respectively.

As depicted in FIGS. 2(a), 2(b) and 2(c), the projection zoom lens 5 here is built up of, in order from the screen 9 side (enlargement side) to the display plane I side of the light bulb 2 (reduction side), a first lens unit G1 having negative refracting power and operable to move during zooming and focusing, a second lens unit G2 having positive refracting power and operable to move during zooming, and a third lens unit G3 having positive refracting power and remaining fixed all the time.

Upon zooming from the wide-angle end to the telephoto end, the first lens unit G1 first moves toward the reduction side and then turns direction and goes back to the enlargement side, where it lies substantially the same position at the wide-angle end and the telephoto end in a state of a projection distance-to-screen of $d_0=1.6$ m. Upon zooming from the wide-angle end to the telephoto end, the second lens unit G2 moves monotonously toward the enlargement side, and the third lens unit G3 remains fixed all the time. Focusing is implemented by the movement of the first lens unit G1 alone.

The first lens unit G1 consists of four lenses, specifically, in order from the enlargement side, three negative meniscus lenses L1, L2 and L3, each convex on the enlargement side, and a positive meniscus lens L4 convex on the enlargement side.

The second lens unit G2 consists of five lenses, specifically, in order from the enlargement side, a cemented doublet consisting a negative meniscus lens L5 convex on the enlargement side and a double-convex positive lens L6, a positive meniscus lens L7 concave on the enlargement side, a double-convex positive lens L8 and a negative meniscus lens L9 convex on the enlargement side.

The third lens unit G3 consists of one plano-convex positive lens L10.

Here, five aspheric surfaces are used: two at both surfaces of the negative meniscus lens L2 that is second as counted from the enlargement side of the first lens unit G1, one at the surface located in, and nearest to the reduction side of, the cemented doublet in the second lens unit G2, and two at both surfaces of the double-convex positive lens L8 on the reduction side.

Set out below are the lens design data in the above example.
The symbols used here have the following meanings.
f is the focal length of the whole zoom lens system,
$F_{NO}$ is an F-number;
ω is the maximum half angle of view on projection;
$D_P$ is the pupil position of the projection zoom lens on the reduction side (the distance from the reflecting surface $r_{22}$ of DMD);
φ is the diameter of the projection zoom lens on the reduction side;
WE is the wide-angle end;
ST is an intermediate setting;
TE is the telephoto end;
$r_1$, $r_2$, etc. are the radius of curvature of each lens surface;
$d_1$, $d_2$, etc. are the space between adjacent lens surfaces;
$n_{d1}$, $n_{d2}$, etc. are the d-line refractive index of each lens;
$v_{d1}$, $v_{d2}$, etc. are the Abbe constant of each lens;
$a_1$, $a_2$, etc. are the maximum effective radius of each lens; and
$d_0$ is the projection distance, defined by a distance from the screen 9 up to the first surface vertex of the projection zoom lens 5.

Aspheric shape is defined by the following formula, provided that x is an optical axis with the direction of travel of light taken as positive, and y is a direction orthogonal to the optical axis.

$$x=(y^2/r)/[1+\{1-(K+1)\}(y/r)^2\}^{1/2}]+A_4y^4+A_6y^6+A_8y^8+A_{10}y^{10}$$

where r is a paraxial radius of curvature,
K is a conical coefficient, and
$A_4$, $A_6$, $A_8$ and $A_{10}$ are the $4^{th}$-, $6^{th}$-, $8^{th}$- and $10^{th}$-order aspheric coefficients, respectively.

| | | | | |
|---|---|---|---|---|
| $r_1 = 34.83$ | $d_1 = 2.5$ | $n_{d1} = 1.72916$ | $v_{d1} = 54.7$ | $a_1 = 19.44$ |
| $r_2 = 17.58$ | $d_2 = 6.3$ | | | $a_2 = 15.36$ |
| $r_3 = 665.83$ (Aspheric) | $d_3 = 2.5$ | $n_{d2} = 1.52542$ | $v_{d2} = 55.8$ | $a_3 = 15.20$ |
| $r_4 = 69.18$ (Aspheric) | $d_4 = 3.2$ | | | $a_4 = 14.33$ |
| $r_5 = 166.23$ | $d_5 = 1.8$ | $n_{d3} = 1.48749$ | $v_{d3} = 70.2$ | $a_5 = 14.05$ |
| $r_6 = 17.41$ | $d_6 = 7.1$ | | | $a_6 = 12.23$ |
| $r_7 = 25.87$ | $d_7 = 3.9$ | $n_{d4} = 1.84666$ | $v_{d4} = 23.8$ | $a_7 = 12.25$ |
| $r_8 = 42.17$ | $d_8 =$ (Variable) | | | $a_8 = 11.66$ |
| $r_9 = 65.32$ | $d_9 = 2.0$ | $n_{d5} = 1.69895$ | $v_{d5} = 30.1$ | $a_9 = 9.20$ |
| $r_{10} = 15.24$ | $d_{10} = 6.8$ | $n_{d6} = 1.80610$ | $v_{d6} = 40.7$ | $a_{10} = 9.05$ |
| $r_{11} = -138.75$ (Aspheric) | $d_{11} = 1.75$ | | | $a_{11} = 8.77$ |
| $r_{12} = -48.58$ | $d_{12} = 3.0$ | $n_{d7} = 1.51742$ | $v_{d7} = 52.4$ | $a_{12} = 8.72$ |
| $r_{13} = -22.84$ | $d_{13} = 4.25$ | | | $a_{13} = 8.76$ |
| $r_{14} = 130.51$ (Aspheric) | $d_{14} = 3.7$ | $n_{d8} = 1.58313$ | $v_{d8} = 59.5$ | $a_{14} = 7.50$ |
| $r_{15} = -22.58$ (Aspheric) | $d_{15} = 0.2$ | | | $a_{15} = 7.57$ |

-continued

| | | | | |
|---|---|---|---|---|
| $r_{16} = 45.37$ | $d_{16} = 1.3$ | $n_{d9} = 1.84666$ | $v_{d9} = 23.8$ | $a_{16} = 7.40$ |
| $r_{17} = 16.53$ | $d_{17} =$ (Variable) | | | $a_{17} = 7.23$ |
| $r_{18} = 35.00$ | $d_{18} = 20.0$ | $n_{d10} = 1.51680$ | $v_{d10} = 64.2$ | $a_{18} = 15.00$ |
| $r_{19} = \infty$ | $d_{19} = 0.5$ | | | $a_{19} = 15.00$ |
| $r_{20} = \infty$ | $d_{20} = 3.0$ | $n_{d11} = 1.48749$ | $v_{d11} = 70.4$ | $a_{20} = 15.00$ |
| | | (DMD cover glass) | | |
| $r_{21} = \infty$ | $d_{21} = 0.483$ | | | $a_{21} = 15.00$ |
| $r_{22} = \infty$ | | | | |
| | | (DMD reflective surface) | | |

Aspherical Coefficients

3rd surface $K = -998.9996$
$A_4 = 1.0275 \times 10^{-4}$
$A_6 = -3.4111 \times 10^{-7}$
$A_8 = 1.0817 \times 10^{-9}$
$A_{10} = -2.0312 \times 10^{-12}$ 4th surface $K = 17.8901$
$A_4 = 8.7572 \times 10^{-5}$
$A_6 = -3.4237 \times 10^{-7}$
$A_8 = 5.8772 \times 10^{-10}$
$A_{10} = -2.2013 \times 10^{-12}$ 11th surface $K = -9.2787$
$A_4 = 4.4718 \times 10^{-5}$
$A_6 = 5.9094 \times 10^{-8}$
$A_8 = 2.5226 \times 10^{-10}$
$A_{10} = -3.8522 \times 10^{-13}$ 14th surface $K = 43.7802$
$A_4 = -8.1119 \times 10^{-6}$
$A_6 = -2.8538 \times 10^{-8}$
$A_8 = 9.7309 \times 10^{-11}$
$A_{10} = -3.2634 \times 10^{-12}$ 15th surface $K = 0.0024$
$A_4 = 4.3557 \times 10^{-7}$
$A_6 = -3.3543 \times 10^{-8}$
$A_8 = -2.4506 \times 10^{-10}$
$A_{10} = -1.4521 \times 10^{-12}$ Zooming Data

| | WE | ST | TE |
|---|---|---|---|
| f(mm) | 18.41 | 20.16 | 22.09 |
| $F_{NO}$ | 2.61 | 2.75 | 2.91 |
| ω (°) | 38.3 | 35.8 | 33.3 |
| $d_0$ | 1600.000 | 1600.243 | 1600.000 |
| $d_8$ | 13.427 | 10.656 | 8.118 |
| $d_{17}$ | 21.720 | 24.248 | 27.029 |
| $D_p$ | −55.14 | −61.83 | −70.22 |
| $Ø_p$ | 21.06 | 22.38 | 24.03 |

FIG. 3 is a collection of aberration diagrams for the design example here at a distance projection of 1.6 m (the distance from the exit surface vertex of the projection data lens to the projection image plane 9 at the wide-angle end.

Figure 3A:
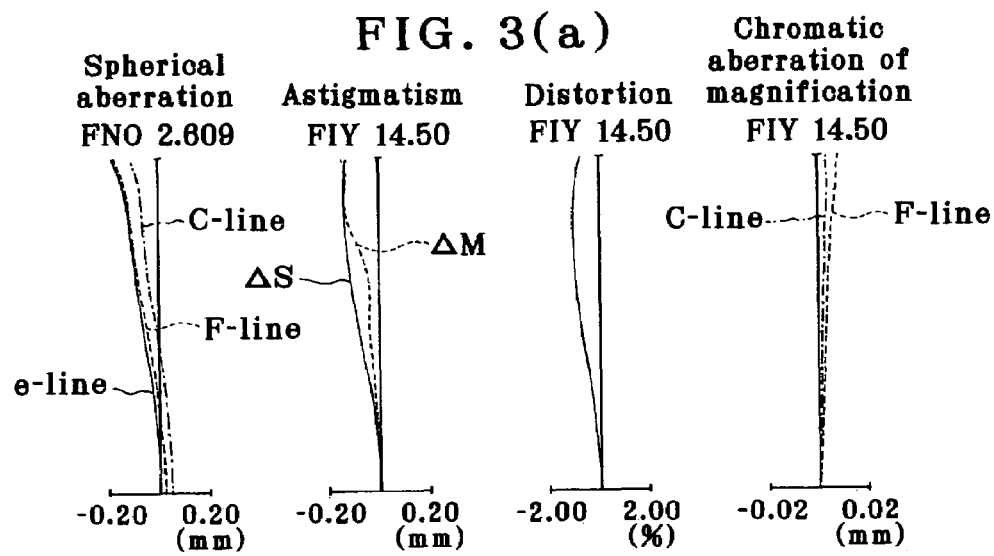
FIGS. 3(a), 3(b) and 3(c) are aberration diagrams for the projection zoom lens according to Example 1 at the wide-angle end, in an intermediate setting, and at the telephoto end, respectively.
Figure 3B:
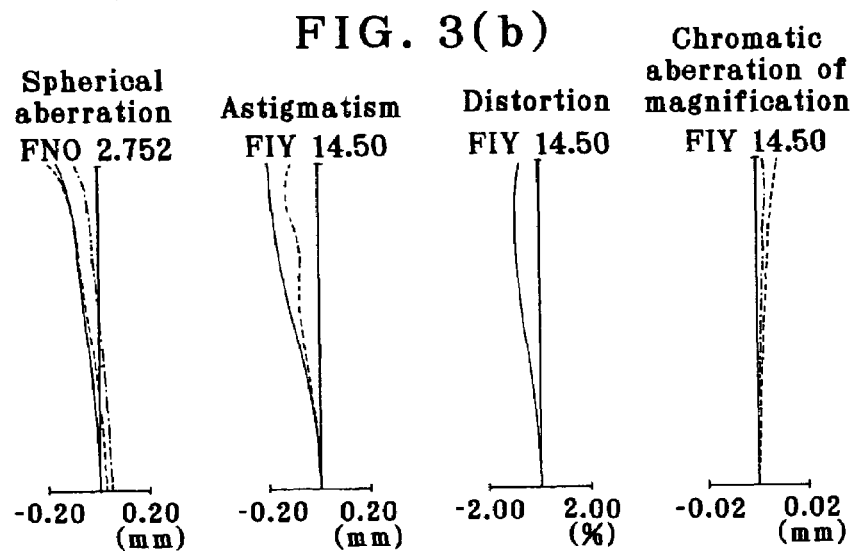
Figure 3C:
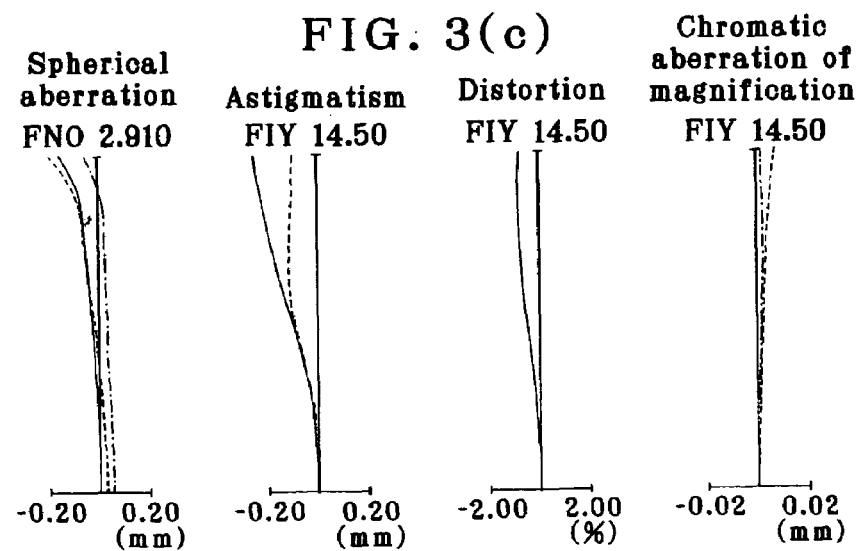

Specifically, FIGS. 3(a), 3(b) and 3(c) are indicative of spherical aberration, astigmatism, distortion and chromatic aberration of magnification at the wide-angle end, in an intermediate setting, and at the telephoto end. In these diagrams, "FIY" stands for the maximum image height at the reflecting surface of the DMD 2.

Tabulated below are the values of conditions (1) to (6) in the projection zoom lens 5 according to the present design example.

$\Delta d / |f| = 0.009$ (1)

$dA / \Delta d = 2.0$ (1-1)

$d_{3,E} / d_{3,C} = 1.030$ (2)

$r_{2,r} / r_{3,f} = 0.472$ (3)

$|f_1| / F_W = 1.455$ (4)

$f_2 / f_W = 1.572$ (5)

$d_{17W} / f_3 = 0.322$ (6)

In the construction of the projector apparatus 1 depicted in FIG. 1, an optical image at the light bulb 2 is of rectangular size having a diagonal length of 29.0 mm.

Note that one aspheric lens 1 molded of a glass material having a refractive index of 1.68 or greater could be used in place of a combination of the negative meniscus lens L1 convex on the enlargement side with the lens L2 having an aspheric surface in the first lens unit G1.

Such replacement allows the first lens unit G1 to consist of three lenses, specifically, in order from the enlargement side, one aspheric negative lens molded of a glass material having a refractive index of 1.68 or greater, a negative lens wherein the absolute value of curvature is larger on the reduction side than on the enlargement side, and a positive lens wherein the absolute value of curvature is larger on the enlargement side than on the reduction side.

Figure 4A:
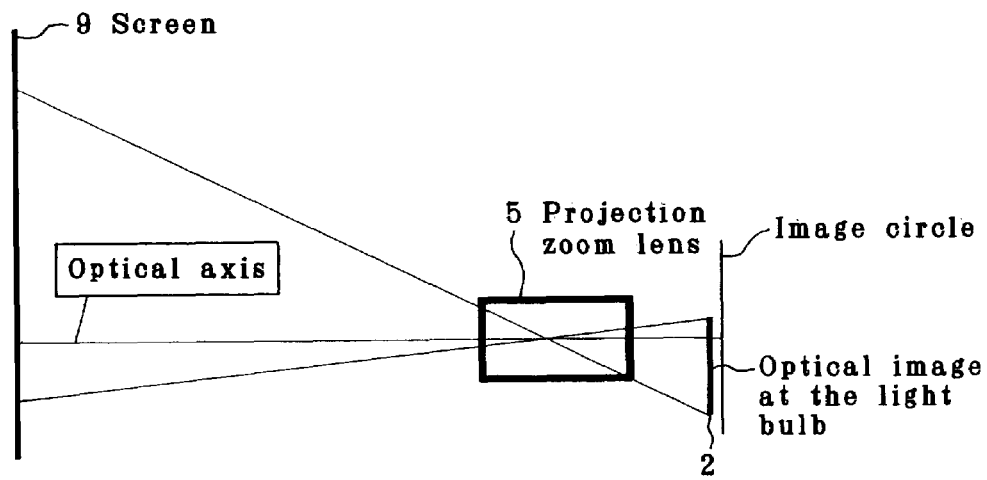
FIGS. 4(A) and 4(B) are illustrative in schematic of modifications to the DMD projector apparatus according to the invention.
Figure 4B:
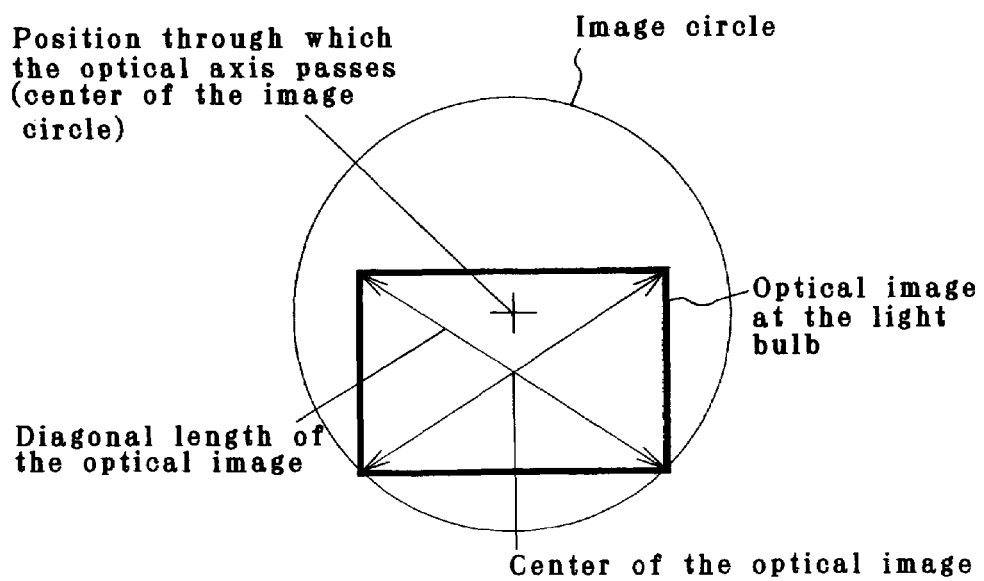

While the projection zoom lens 5 is used as such, the projector apparatus could be modified as depicted in FIG. 4 illustrative in schematic of a modification to the above example. Specifically, FIG. 4(A) is a sectional view of that modification as taken along its optical axis, and FIG. 4(B) is a front view illustrative of what relation an optical image at the light bulb has to an image circle.

As depicted in FIG. 4, while an optical image at the light bulb is just received in an image circle (of 29.0 mm in diameter) for the projection zoom lens 5, the center of the optical image is positioned in such a way as to avoid an overlap with the optical axis of the projection zoom lens 5 (that passes through the center of the image circle).

More specifically, the optical image at the light bulb 2 is of rectangular shape having a diagonal length of 17.5 mm and smaller in area than the image circle.

And then, that rectangle is configured such that both ends of its one long side are contiguous to the image circle of 29.0 mm in diameter.

And then, the optical image at the light bulb 2 is positioned in such a way as to lie vertical to the optical axis of the projection zoom lens 5.

Such being the arrangement, the center of the optical image is positioned off the optical axis of the projection zoom lens 5. As a result, the center of the image onscreen on the projection side is formed off the center of the zoom lens.

If the screen plane and the optical axis of the projection zoom lens are approximate to vertical, the image is then corrected for trapezoidal distortion, too.

Accordingly, even when the projector apparatus is mounted on a ceiling or a table, there is no trapezoidal distortion, and a viewer can view an image projected onscreen just from the front.

Further, if the light bulb 2 and/or the zoom lens 5 are moved in such a way as to allow the light bulb to shift at least within the image circle, then the position of the projected image is easy to control.

Furthermore, if the light bulb 2 and/or the zoom lens 5 are moved in such a way as to permit the light bulb and the zoom lens to tilt, then the projected image is easily corrected for trapezoidal distortion.

I claim:

1. A projection zoom lens system, comprising, in order from an enlargement side to a reduction side,
   a first lens unit of negative refracting power,
   a second lens unit of positive refracting power, and
   a third lens unit of positive refracting power,
   wherein:
   upon zooming from a wide-angle end to a telephoto end with a projected image focusing on a constant position, the first lens unit and the second lens unit move while the third lens unit remains fixed, and
   wherein:
   the third lens unit is located on the enlargement side of a light bulb, and transmits an incident light ray from an illumination optical system adapted to illuminate the light bulb and a light ray reflected from the light bulb, and
   wherein:
   the first lens unit consists of, in order from the enlargement side to the reduction side,
   a meniscus shaped lens convex on the enlargement side and having negative power,
   a lens having two aspherical surfaces,
   a lens of negative power, wherein an absolute value of curvature is larger on the reduction side than on the enlargement side, and
   a lens of positive power, wherein an absolute value of curvature is larger on the enlargement side than on the reduction side.

2. The projection zoom lens system according to claim 1, wherein the lens of negative power and the lens of positive power located in the first lens unit and on the reduction side are each a meniscus lens convex on the enlargement side.

3. A projector apparatus comprising the projection zoom lens system according to claim 1 and operable to project an original image formed on the light bulb onto a screen.

4. A projection zoom lens system, comprising, in order from an enlargement side to a reduction side,
   a first lens unit of negative refracting power,
   a second lens unit of positive refracting power, and
   a third lens unit of positive refracting power,
   wherein:
   upon zooming from a wide-angle end to a telephoto end with a projected image focusing on a constant position, the first lens unit and the second lens unit move while the third lens unit remains fixed,
   wherein:
   the third lens unit is located on the enlargement side of a light bulb, and transmits an incident light ray from an illumination optical system adapted to illuminate the light bulb and a light ray reflected from the light bulb, and
   wherein:
   the second lens unit consists of, in order from the enlargement side to the reduction side,
   a cemented doublet wherein a lens of negative power and a lens of positive power are cemented together in this order,
   a lens of positive power,
   a lens of positive power, wherein an absolute value of curvature is larger on the reduction side than on the enlargement side, and
   a meniscus lens of negative power concave on the reduction side.

5. A projector apparatus comprising the projection zoom lens system according to claim 4 and operable to project an original image formed on the light bulb onto a screen.

6. A projection zoom lens system, comprising, in order from an enlargement side to a reduction side,
   a first lens unit of negative refracting power,
   a second lens unit of positive refracting power, and
   a third lens unit of positive refracting power,
   wherein:
   upon zooming from a wide-angle end to a telephoto end with a projected image focusing on a constant position, the first lens unit and the second lens unit move while the third lens unit remains fixed,
   wherein:
   the third lens unit is located on the enlargement side of a light bulb, and transmits an incident light ray from an illumination optical system adapted to illuminate the light bulb and a light ray reflected from the light bulb, and
   wherein the lens located in, and nearest to the reduction side of, the second lens unit is a lens of negative power concave on the reduction side, and the lens located in, and nearest to the enlargement side of, the third lens unit is a lens of positive power convex on the enlargement side, and wherein both said lenses satisfy the following condition:

$$0.4 < r_{2,r}/r_{3,f} < 0.6 \tag{3}$$

where $r_{2,r}$ is a paraxial radius of curvature of the lens located in, and nearest to the reduction side of, the second lens unit, and $r_{3,f}$ is a paraxial radius of curvature of the lens located in, and nearest to the enlargement side of, the third lens unit.

7. A projector apparatus comprising the projection zoom lens system according to claim 6 and operable to project an original image formed on the light bulb onto a screen.

8. A projection zoom lens system, comprising, in order from an enlargement side to a reduction side:
   a first lens unit of negative refracting power,
   a second lens unit of positive refracting power, and
   a third lens unit of positive refracting power,
   wherein:
   upon zooming from a wide-angle end to a telephoto end with a projected image focusing on a constant position, the first lens unit and the second lens unit move while the third lens unit remains fixed,
   the third lens unit is located on the enlargement side of a light bulb, and transmits an incident light ray from an illumination optical system adapted to illuminate the light bulb and a light ray reflected from the light bulb,
   wherein:
   the first lens unit includes two negative lens elements and a positive lens element, a total number of lens elements in the first lens unit being four, and the second lens unit comprises two negative lens elements and three positive lens elements, a total number of lens elements in the second lens unit being five, and
   wherein:
   the first lens unit and the second lens unit satisfy the following conditions:

$$1.4 < |f_1|/f_w < 1.6 \tag{4}$$

$$1.4 < f_2/f_w < 1.6 \tag{5}$$

where $f_w$ is a focal length of the whole projection zoom lens system at a projection distance of 1.6 in at the wide angle end, $f_1$ is a focal length of the first lens unit, and $f_2$ is a focal length of the second lens unit.

9. A projection zoom lens system, comprising, in order from an enlargement side to a reduction side, a first lens unit of negative refracting power, a second lens unit of positive refracting power, and a third lens unit of positive refracting power, wherein:

upon zooming from a wide-angle end to a telephoto end with a projected image focusing on a constant position, the first lens unit and the second lens unit move while the third lens unit remains fixed, wherein:

the third lens unit is located on the enlargement side of a light bulb, and transmits an incident light ray from an illumination optical system adapted to illuminate the light bulb and a light ray reflected from the light bulb, and wherein:

the second lens unit comprises, in order from the enlargement side to the reduction side, a cemented doublet including a lens of negative power and a lens of positive power cemented together in this order, a lens of positive power, a lens of positive power, wherein an absolute value of curvature is larger on the reduction side than on the enlargement side, and a meniscus lens of negative power concave on the reduction side.

* * * * *